Figures 8, 9:
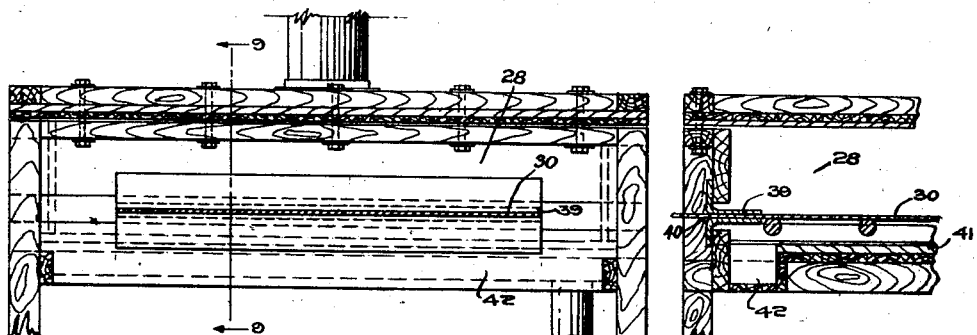

Aug. 16, 1932.  R. ERICSON  1,871,843
METHOD OF MANUFACTURING TILE BOARD
Filed Oct. 17, 1928  5 Sheets-Sheet 1

INVENTOR
Richard Ericson
BY
ATTORNEY

Aug. 16, 1932. R. ERICSON 1,871,843
METHOD OF MANUFACTURING TILE BOARD
Filed Oct. 17, 1928  5 Sheets-Sheet 2
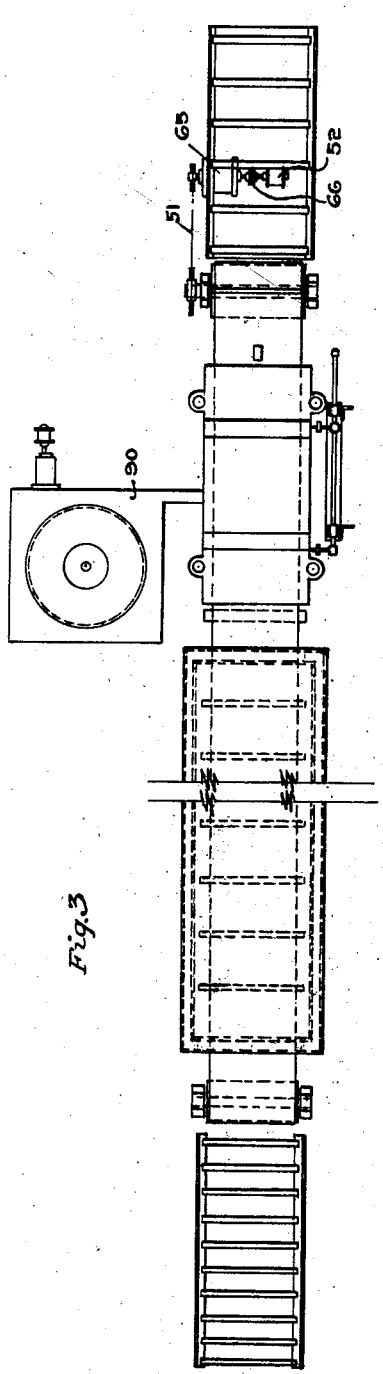

Aug. 16, 1932. R. ERICSON 1,871,843
METHOD OF MANUFACTURING TILE BOARD
Filed Oct. 17, 1928 5 Sheets-Sheet 3
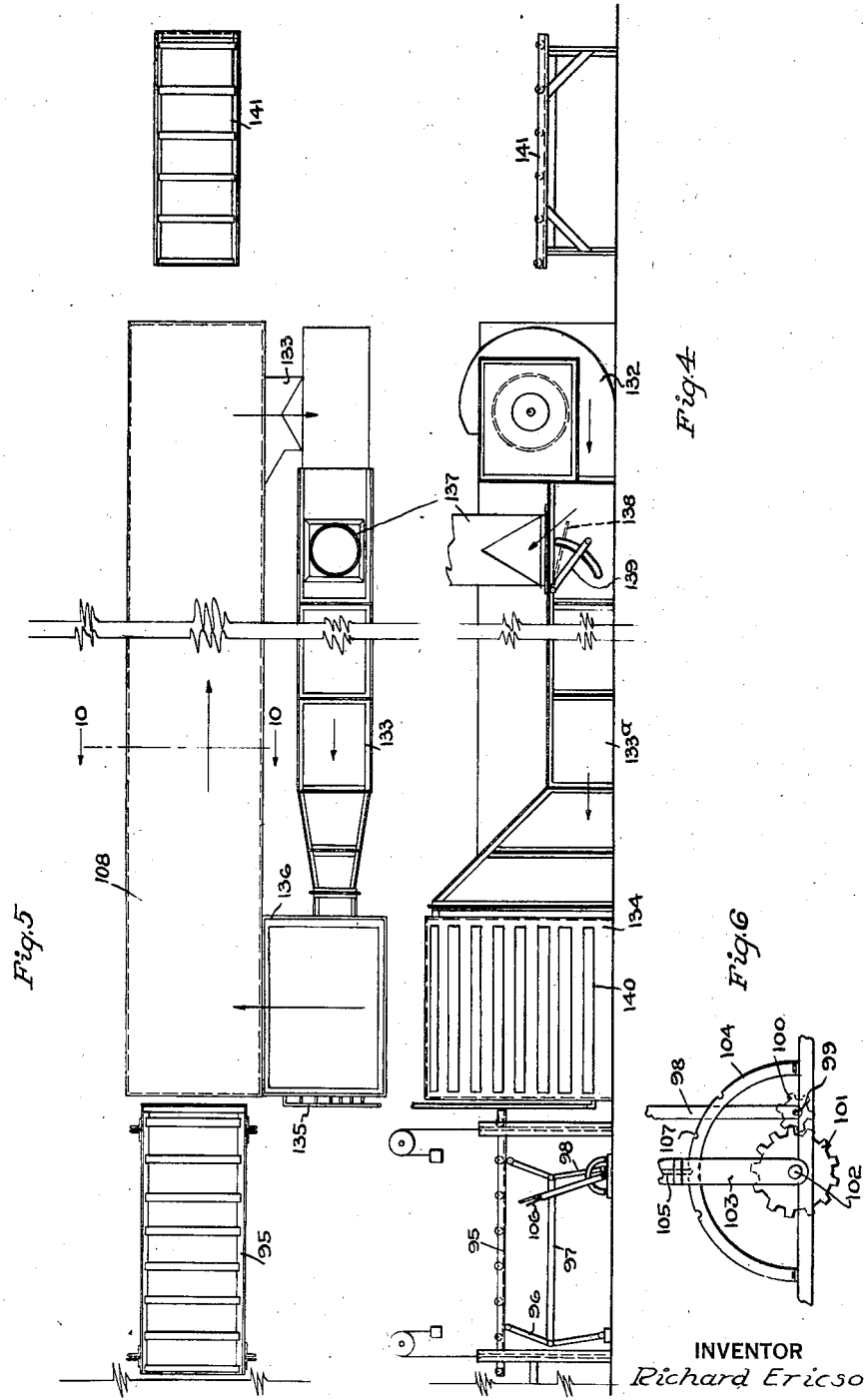
INVENTOR
Richard Ericson
BY
ATTORNEY Aug. 16, 1932.  R. ERICSON  1,871,843
METHOD OF MANUFACTURING TILE BOARD
Filed Oct. 17, 1928  5 Sheets-Sheet 4

INVENTOR
Richard Ericson
BY
ATTORNEY

Aug. 16, 1932.  R. ERICSON  1,871,843
METHOD OF MANUFACTURING TILE BOARD
Filed Oct. 17, 1928   5 Sheets-Sheet 5
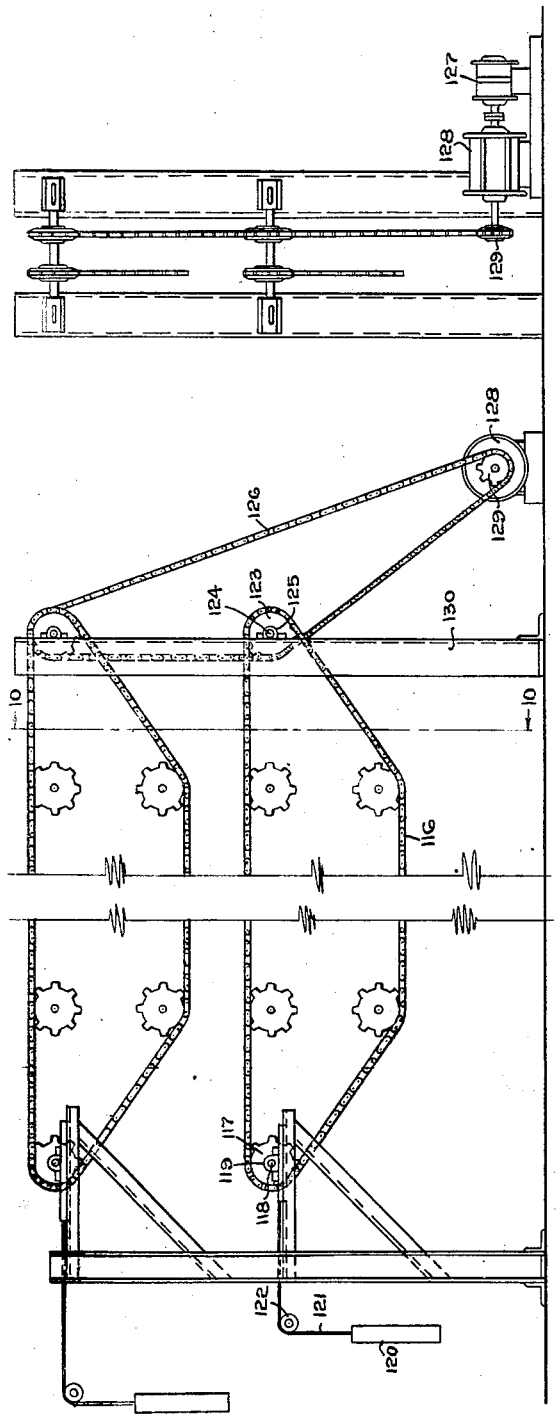
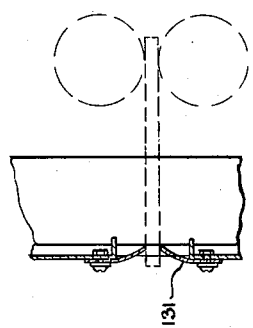
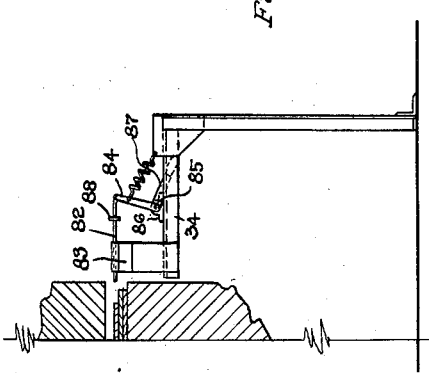
INVENTOR
Richard Ericson
BY
ATTORNEY Patented Aug. 16, 1932

1,871,843

UNITED STATES PATENT OFFICE

RICHARD ERICSON, OF CHICAGO, ILLINOIS, ASSIGNOR TO UNITED STATES GYPSUM COMPANY, OF CHICAGO, ILLINOIS, A CORPORATION OF ILLINOIS

METHOD OF MANUFACTURING TILE BOARD

Application filed October 17, 1928. Serial No. 312,998.

This invention relates to a method of forming tile or other designs on boards of moistened plaster board, the latter being usually manufactured from a cementitious core faced on both sides with paper.

Plaster board and wall board are usually manufactured with a core of cementitious material, such as gypsum composition, this core having a paper facing material on each surface of the sheet. The paper may be provided with a rosin sizing impregnated in the fibres thereof and the core material is usually but not necessarily of a porous nature, the pores being obtained by mixing a foam with the gypsum stucco and water during the initial mixing operation. The paper sheets are applied to the plastic core material before any appreciable setting takes place. After the board is formed, a time period is allowed which permits the gypsum to set, and then the boards are cut to length and dried. The drying of the boards produces a profound effect on the gypsum core in that the tensile and compressive strength of the core is tripled—in other words, the gypsum core has only one-third the tensile and compressive strength when wet as when dry.

The present invention contemplates the production of tile board in which grooves representing the joints of ordinary tile, are pressed on one surface of the plaster board. The production of such a tile board presents many operating difficulties and problems. If an attempt is made to stamp the impression of the tile on the surface of the board immediately after the setting reaction the board is often cracked due to the low compressive and tensile strength of the core material adjacent the groove formed opposite the pressing die. If the board is first dried and then wet with cold water on one surface only, the rosin size in the paper retards the entrance of the water into the board often as much as four hours which greatly slows up production and increases the cost of the manufacture of the tile board.

I have found that by introducing moisture into the surface of the board to be pressed by means of steam which condenses within the core to form water, a surface is produced which may be readily pressed by a die to form the tile grooves without damaging the board or destroying the bond between the paper cover sheets and the core material.

An object of this invention, therefore, is to provide a method of forming tile board from plaster board in which one surface of the tile board is wet by means of steam or other fluid so as to provide a face which may be readily pressed by a die to form the tile grooves.

Another object of the invention is to provide a method as above described, in which a resulting tile board is formed having a maximum tensile strength and in which the bond between the paper cover and the core is not destroyed.

A further object of the invention is to provide a method of moistening only one surface of a dried plaster board by the application of steam and condensation thereof, so that the heat and moisture of the steam will soften the paper fibres on the cover sheet of the plaster board, and so that the crushing strength of the core material is reduced to permit the crushing of the cells in the core material by the application of pressure.

A still further object of the invention is to provide a machine or apparatus suitable for carrying out the above method and to produce tile board of high quality from plaster board; also to improve tile board, and the method of and apparatus for manufacturing same in other respects hereinafter specified and claimed.

Figure 7:
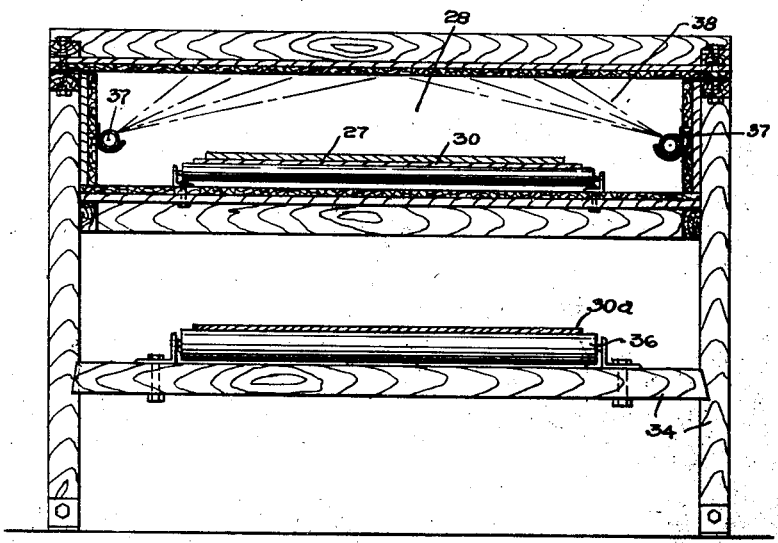
Figure 1:
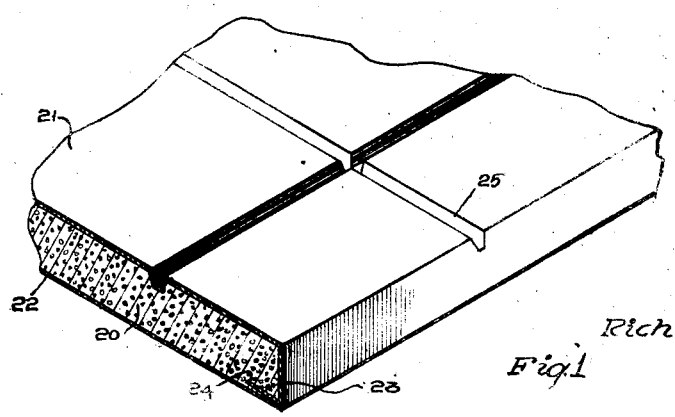
Figure 10:
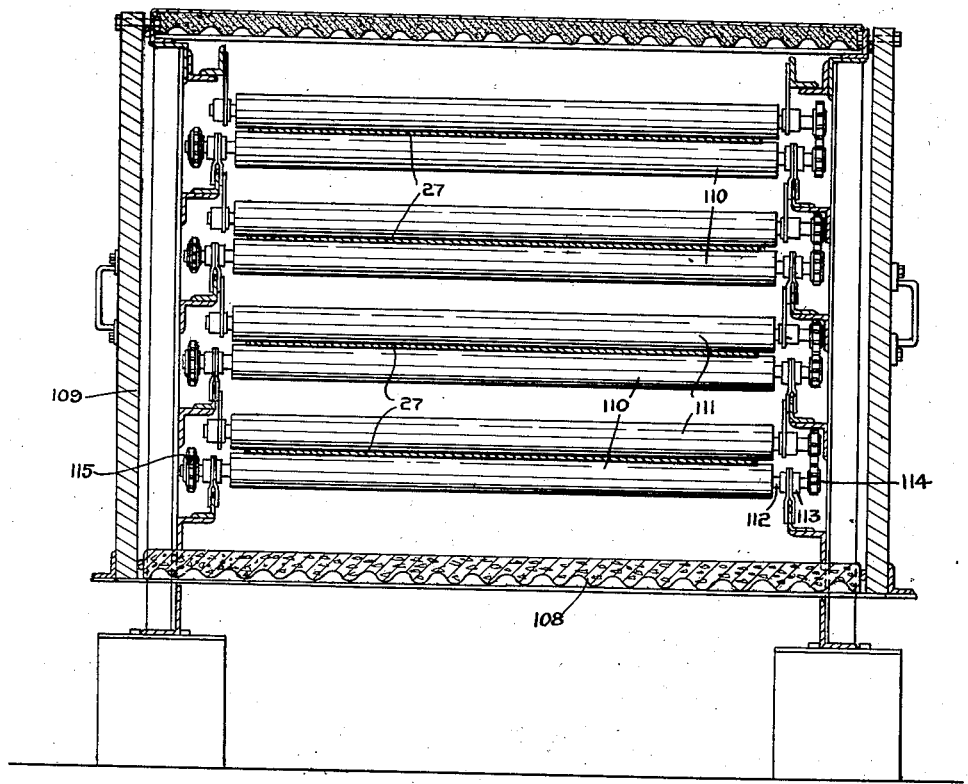

Reference is to be had to the accompanying drawings forming a part of this specification in which, Fig. 1 is a sectional, perspective view of the tile board produced by my improved method and apparatus, Figs. 2 and 3 are a side elevation and a plan view respectively of the feed end of my improved apparatus for manufacturing tile board, Figs. 4 and 5 are an elevation and plan view respectively of the delivery end of the apparatus, Fig. 6 is a fragmentary detailed elevation of portion of the kiln feed mechanism, Fig. 7 is a transverse sectional view through the heating chamber taken on the line 7—7 of Fig. 2, Fig. 8 is an end sectional elevation of the steaming chamber taken on line 8—8 of Fig. 2, Fig. 9 is a fragmentary sectional elevation through the inlet end of the steaming chamber, Fig. 10 is a transverse, sectional elevation through the drying kiln taken on the line 10—10 of Fig. 5.

Figure 11:
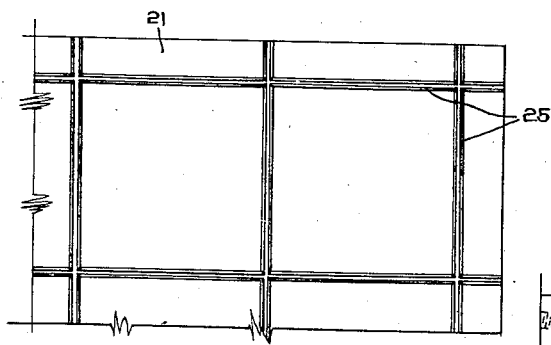
Figure 12:
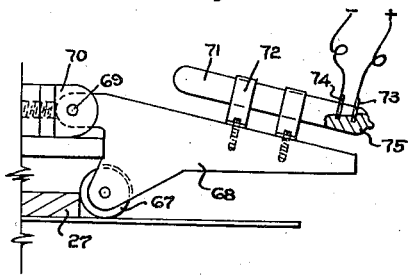
Figure 13:
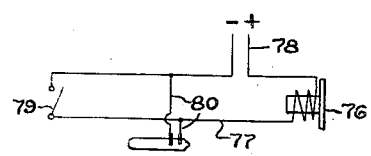

Fig. 11 is a fragmentary plan view of a portion of the finished tile board,

Fig. 12 is a sectional elevation of the mercury switch for controlling the movement of the plaster board in the plant, Fig. 13 is a diagrammatic view of the electrical circuits for controlling the movement of the plaster board, Fig. 14 is a fragmentary side elevation of the driving mechanism for the rollers in the drying kiln, Fig. 15 is an end elevation of the driving mechanism for the kiln, Fig. 16 is a fragmentary sectional elevation showing the board positioning mechanism for the press, and Fig. 17 is a fragmentary sectional elevation showing the outlet end of the drying kiln.

Plaster board and wall board as usually manufactured, are composed of a core 20 of a cementitious material, such as gypsum, which is covered on each face by paper cover sheets, 21 and 22. The cover sheet 21 is usually provided with a fold 23 about each longitudinal edge of the board, this fold 23 terminating in a flap 24 which is imbedded in the core material 20. The cover sheet 22 then extends across the board over the flap 24, usually being attached thereto by means of an adhesive not shown. The core material 20 is usually, but not necessarily, formed with pores by mixing a foam, which is well known to the art, with the stucco and water during the preliminary mixing. Fibres of any desired nature may or may not be mixed with the plastic material before forming into boards. The paper cover sheets 21 and 22 are usually impregnated with a rosin sizing material which improves the properties of the paper.

With my improved method, the cover sheet 21 and the core material adjacent thereto, is moistened by the application of steam. The steam quickly passes through the cover sheet 21 and upon striking the cool core material the steam condenses and deposits moisture in that core material adjacent to sheet 21. The steaming period is comparatively short, ten minutes or less being usually sufficient to accomplish the desired results and bring the upper surface of the board into a more or less weak and plastic condition suitable for the application of the tile grooves or other designs 25 by means of a die of suitable shape applied to said cover sheet by hydraulic or other pressure. During the steaming process, the cover sheet 22 and the core material 20 adjacent thereto, is protected from the steam and from the moistening action of the steam, by supporting said board on a flat belt which is substantially impervious to steam and moisture. The action of the steam accomplishes several results, namely:

1. The rosin size in the paper is softened so that the steam readily passes through the paper into the core 20.

2. The steam contacts with the cool core material 20 and condenses, thus wetting the core material adjacent the paper cover sheet 21.

3. The wetting of the plastic material 20 reduces its crushing strength to about one-third of its strength when dry.

4. The heat and moisture in the paper fibres, soften same so they may be imprinted with the grooves 25 without breaking the paper.

5. The moistened gypsum core 20 containing air cells, is easily crushed down to a greater density due to its low compressive strength so as to form the grooves 25.

6. The lower cover sheet 22 and the plastic material adjacent thereto is not moistened and retains its original strength so that it is not cracked when the grooves 25 are pressed into the upper surface of the board.

The original plaster boards 27 are delivered to a steaming chamber 28 in any suitable way such as by a roller conveyor 29 which delivers the boards 27 onto a belt conveyor 30. Plaster board 27 may be manually deposited upon the roller conveyor 29 and then pushed manually onto the conveyor belt 30. The belt 30 is supported at one end on a pulley 31 which is secured to a rotatably mounted shaft 32, the latter being mounted in bearings 33 which are supported on suitable frame work 34. The steaming chamber 28 may be conveniently formed of a wooden box, rectangular in cross section, as seen in Fig. 7, this steaming chamber being adapted preferably to only enclose the upper reach of the belt 30 while the lower reach 30d of the said belt returns along rollers 36, which are rotatably supported on frame work 34. A plurality of steam pipes 37 are provided inside of the steaming chamber 28, these steam pipes being provided with perforations so as to direct a stream of steam 38 into the steaming chamber 28 above the plaster board 27. Flaps of flexible material 39 are provided adjacent to inlet opening 40 of the steaming chamber 28 so as to prevent the escape of steam as the board enters the steaming chamber, and similar flaps are provided adjacent the outlet end of said steaming chamber. The steaming chamber 28 is preferably inclined slightly rearwardly as seen in Fig. 2 so that the surplus water condensed from the steam runs down the floor 41 of the steaming chamber into a drain trough 42 which leads to the outside of the chamber. The quantity of steam, the length of the steaming chamber 28 and the speed of the belt 30 are so adjusted that the upper cover sheet 21 and the plastic core 20 adjacent thereto are properly steamed and moistened, this steaming period usually taking less than ten minutes.

After leaving the steaming chamber 28, the belt 30 passes between the upper platen 45 and lower platen 46 of a press which may be hydraulic, in which case it is provided with hydraulic pistons 47 of the usual type for operating the lower platen 46. The lower face of the upper platen 45 is provided without standing ribs of a shape suitable for forming the tile grooves 25. This upper platen 45 is ordinarily applied to the upper surface of the board while at normal temperature but if desired, this upper platen may be heated by means of a steam coil 48 connected to said platen. The opening and closing of the press is usually accomplished by the manual actuation of an operating handle 49 which controls the water valve on the pipe leading to the hydraulic press. Any other type of mechanical press may be used for actuating the platens 45 or 46. The upper reach of the belt 30 passes from the hydraulic press over a driven pulley 50, the continuous rotation of which may be accomplished in any suitable way such as by chain 51 leading from an electric motor 52. The pulley 50 is secured to shaft 53 which in turn is rotatably mounted in bearings 54 secured to the framework 34 of the machine. The belt 30 now passes over a roller 55 and back between the press platens 45 and 46, over a roller 56, a roller 57 and a roller 58 to the pulley 31. The pulley 57 is an idler which is secured to a shaft 60, the latter being rotatably mounted in slide bearings 61 which are mounted to slide on vertical guides 62. A weight 63 is secured to the slide bearings 61 so that the pulley 57 is urged downwardly under the action of said weight 63, thus maintaining a uniform tension in the belt 30.

A speed reducer 65 and a magnetic clutch 66 of standard design are interposed between the motor 52 and chain 51. As the plasterboard 27 is moved forwardly between the platens 45 and 46 by the belt 30, the forward edge of the plasterboard 27 engages a roller 67 which is rotatably mounted on a lever 68, the latter being secured by a pivot pin 69 to a bracket 70 which is secured to a suitable framework on machine. A mercury tube 71 is secured by clip 72 to the lever 68 and electric terminals 73 and 74 pass through the tube 71 so that the lower ends thereof are normally connected by a globule 75 of mercury when the mercury switch is tilted downwardly as shown in Fig. 12. The forward movement of the plasterboard 27 causes said board to engage the roller 67 and lift the mercury switch 71 upwardly so that the mercury globule 75 flows to the left end of the tube as seen in Fig. 12, and breaks contact between the electric terminals 73 and 74. A solenoid 76 of standard design, controls the operation of the magnetic clutch 66, said solenoid being operated in an electrical circuit 77 which has branches 78 leading to a source of electrical power. A manually operated switch 79 is included in the circuit 77 and the mercury switch 71 is connected in parallel with switch 79 in circuit 77 by branch line 80. Thus, the forward edge of the board 27 operates the mercury switch 71 to open the circuit 77, and solenoid 76 permits the magnetic clutch 66 to disconnect the motor 52 from the chain 51 thus stopping the movement of belt 30 with the board lying directly under the platen 45.

In order to accurately align the board 27 laterally with respect to the platen 45, a pair of plungers 82 are slidably received in slide bearings 83, the latter being secured to a framework 34 of the machine. The outer ends of plungers 82 are pivotally secured to the upper ends of levers 84, and the lower ends of said levers 84 are secured to a shaft 85 which is also rotatably mounted in bearings 86 secured to the framework 34 of the machine. A manually operated lever 87 is secured to the shaft 85 so that the plungers 82 may be moved inwardly by manual actuation of said lever 87, the inward movement of said plungers being limited by stop collars 88 secured thereto. The inward ends of plungers 82 engage the edge of board 27 so as to properly align same with respect to the upper platen 45. After the board is properly aligned under the platen 45, said plungers 82 are withdrawn and the press is closed by manual actuation of the lever 49, so as to form the tile grooves 25 in the upper face of the board. The press is connected to an accumulator 90 of standard design where the water for operating the press is stored under pressure.

After the operator opens the press by actuating the lever 49, he closes switch 79 which starts the belt 30 moving, thus carrying the board outwardly from underneath platen 45. As the board 27 passes out from underneath the roller 67, the lever 68 moves downwardly to the position shown in Fig. 12, ready for actuation by a board following on belt 30. The operator then opens switch 79, which places the mercury switch 71 in control of circuit 77. If desired, the belt 30 may be so arranged as not to pass between the platens 45 and 46 but only to deliver the board between said platens so that the belt itself is not exposed to the pressure of the press. In this case, an additional pair of plungers 82, not shown, would be provided for aligning the board under the platen 45, longitudinally as well as transversely. The roller 90 is rotatably mounted above the pulley 50, this roller being adapted to smooth out any inequalities in the pressed upper surface of the plasterboard as said board passes between said roller 90 and belt 30.

As the plasterboard passes from belt 30, it is delivered onto a roller conveyor 91 and spray pipes 92 are located above said roller conveyor so as to apply a liquid material to the upper surface of the board in the form of spray 93. This liquid material may be of any desired nature such as a solution of glue rosin or starch or other finishes which are adapted to prevent rupture of the paper cover sheet 21 adjacent the grooves 25 when said cover sheet is subsequently dried. This sizing material may also improve the bond between the paper cover sheet 21 and core 20 adjacent the grooves 25. If desired, a liquid coating composition may also be applied at this point, this coating composition being in the nature of a cold water paint or other material. A preferred form of liquid treating medium is a solution of one pound of hide glue to one gallon of water. It should be understood that a continuous conveyor may be used instead of the roller conveyor 91, if desired, so that continuous movement of the board is accomplished throughout the process.

As the tile board 27 leaves the conveyor 91 by manual or mechanical actuation, it moves onto a roller or other conveyor 95 which is supported on a plurality of parallel links 96, each pair of links being joined at the center by a connecting bar 97. One link 98 is secured at its lower end to a shaft 99, the latter being rotatably mounted adjacent the floor, and a pinion 100 is also secured to said shaft 99. The pinion 100 meshes with a gear 101 which is secured to a shaft 102. A lever 103 is also secured to the shaft 102 and an arcuate segment 104 is secured adjacent the shaft 102. A catch 105 is operated by a handle 106 on the lever 103, said catch being adapted to engage in suitable notches 107 formed on the periphery of segment 104. The operating mechanism of the conveyor 95 is so adjusted that said conveyor may be elevated to different heights by manual actuation of lever 103 so that the tile board 27 may be delivered into different decks of a drying kiln 108.

The kiln 108 may be of any desired construction, but is preferably provided with removable doors 109 on each side thereof so that easy access to the inside of the kiln may be had. The conveyor mechanism of the kiln is composed of a series of lower rollers 110 and upper rollers 111, said rollers being spaced apart a sufficient distance to permit the passage of the tile board 27 but still prevent the longitudinal warping of the boards due to the heat of the drying operation. The upper rollers 111 will sometimes be unnecessary where warping is not serious. The rollers 110 and 111 are arranged in decks, such as four decks as shown in Fig. 10. The length of the drying kiln is directly proportional to the number of decks used so that a considerable saving in floor space is obtained by using a plurality of decks. Each of the rollers 110 and 111 are mounted on shafts 112 which are rotatably supported in bearings 113 near the end thereof. A gear 114 is secured to one end of each of the shafts 112 said gears, meshing together to cause the rollers 110 and 111 to rotate in unison in pairs. A sprocket wheel 115 is secured to the opposite end of one of the shafts 112, several of said sprocket wheels being connected by a chain 116 which serves to drive a number of the shafts 112. The chains 116 pass over sprocket wheels 117 at one end, said sprocket wheel being secured on shaft 118, the latter being rotatably mounted in slide bearings 119. A weight 120 is connected by a cable or chain 121 to the slide bearings 119, said cable passing over a pulley 122 so that the tension in chain 116 is always maintained uniform. At the opposite end of the kiln 108, chain 116 passes around a drive sprocket wheel 123 which is secured to shaft 124, the latter being rotatably mounted in bearings 125. A plurality of the sprocket wheels 123 are driven by a chain 126, from a motor 127 connected by a speed reducer 128 to a sprocket wheel 129. All of this mechanism is suitably supported upon framework 130.

Flexible gasket members 131 are provided at the outlet of the kiln so as to maintain a substantially air tight connection with the moving boards 27. In order to maintain a continuous and rapid flow of warm, unsaturated air through the drying kiln, a blower 132 is provided which has a suction duct 133 leading from the delivery end of the kiln. An outlet duct 133a leads from the blower 132 into a heater 134 which is supplied with a source of heat, such as by closed steam pipes 135. The air from the heater 134 passes through a duct 136 into the inlet of the kiln 108 so that a parallel flow of warm air through the kiln is obtained. It should be understood that the connections 133 and 136 may be reversed so that the current of air may flow through the kiln in a countercurrent direction to the movement of the boards there through. In order to carry off the moisture dried from the boards and to maintain the flowing air in an unsaturated condition, I provide an outlet vent 137 connected to the duct 133d, the opening in said vent being controlled by a damper 138 provided with an operating lever 139. The moist air will flow out of the duct 137 and in order to provide for an inlet of outside dry air into the system, I provide suitable openings 140 in the heater 134, the size of these openings being controlled in any suitable way so as to maintain the proper conditions of humidity in the kilns. After the boards are dried thoroughly in the kiln 108, they pass out of said kiln to any discharge point, such as a roller conveyor 141 where they are allowed to cool and then are ready for shipment.

In operation, the boards 27 to be pressed pass along a roller conveyor 29 onto belt conveyor 30 which carries same into the steam chamber 28 where the upper surface of the plasterboards are subjected to a jet of steam 38 from perforated pipes 37. After the upper portion of the plasterboard is moistened by the steam, the boards 27 pass with the belt 30 between press platens 45 and 46 until the forward edge of the board engages roller 67 and actuates mercury switch 71 to disconnect the magnetic clutch 66 and thus stop the movement of the belt 30. The operator then actuates lever 87 so as to cause plungers 82 to engage the edge of the board 27 and align said board relative to the upper platen 45. The plungers 82 are now withdrawn and lever 49 is manually actuated and the press is closed so that the tile grooves 25 are pressed into the upper surface thereof. After opening the press, the operator closes switch 79 which starts the movement of the belt 30 until the board is disengaged from roller 67. The disengagement of the roller 67 from boards 27 causes the mercury switch 71 to move downwardly so that circuit 77 is again closed whereupon the operator opens switch 79 leaving the mercury switch 71 in control of circuit 77.

As the boards 27 move out of the press under pressing roll 90 which serves to roll out slight inequalities in the upper surface thereof, said board moves onto a roller conveyor 91 where a treating liquid is sprayed onto the upper surface of said board from spray pipes 92. The board 27 is now moved onto the roller conveyor 95 which is elevated by rocking lever 103, until said conveyor registers with the desired deck in the drying kiln 108. The board is then pushed into the kiln so as to engage between rollers 110 and 111 which cause the forward movement of the board to the kilns. The rapid current of warm, unsaturated air is maintained in the kiln 108 by blower 132 which causes the air to pass through duct 133d and heater 134, into the feed end of the kiln 108. Moist air is expelled from the system through vent 137 controlled by damper 138 and fresh, dry air, is admitted from the outside into the system through heater openings 140. The dried boards are delivered onto the roller conveyor 131 and, after cooling, are ready for shipment.

It should be understood in the claims to follow, that the words, "Tile groove" are generically directed to any design, figure, etc., which may be pressed onto the surface of the board by means of a die.

I would state in conclusion that while the example illustrated and described constitutes a practical embodiment of my invention, I do not limit myself precisely to these details since manifestly the same can be considerably varied without departing from the spirit of the invention as defined in the appended claims.

Having thus described my invention, I claim as new and desire to secure by Letters Patent:

1. The method of forming tile board from plasterboard having a plurality of paper cover sheets separated by a cementitious core, which comprises subjecting one cover sheet of said board to the action of steam while the opposite cover sheet of said board is protected from the steam so that the first mentioned cover sheet and a portion of the core are moistened by condensed water, pressing the tile impression upon the moist cover sheet of said board, and drying said tile board.

2. The method of forming tile board from plasterboard having a plurality of fibrous cover sheets separated by a cementitious core, which comprises subjecting said plasterboard to the action of steam so as to moisten said boards, pressing the tileboard impressions upon said moist board, and drying said board.

3. The method of forming tile board from plasterboard, said plasterboard having a plurality of fibrous sheets separated by a cementitious core material, which comprises subjecting a portion only of said plasterboard to the action of steam so as to moisten said portion with condensed water, pressing the tile impressions upon said moistened portion, and drying said board.

4. The method of manufacturing tile board which comprises continuously advancing a plaster board having a cementitious core and paper cover sheets, subjecting said plaster board to the action of steam during the movement thereof so that a portion of said plaster board is moistened, pressing tile board impressions on the moistened portion of said plasterboard, and drying said board.

5. The method of manufacturing tile board which comprises moistening a face of said tile board by the application of steam, pressing the tile board impressions on said moistened face, applying a treating liquid to said moistened face, and drying said board.

6. The method of forming tile board from plaster board having a plurality of fibrous cover sheets separated by a cementitious core material, which comprises subjecting one of said core sheets and a portion of said core material to a moistening fluid, pressing tile impressions upon said moistened cover sheet, and drying said board.

7. The method of manufacturing tile board, which comprises moistening a face of said tile board, pressing the tile board impressions on said moistened face, and drying said board.

RICHARD ERICSON.